United States Patent
Mehkri et al.

(10) Patent No.: US 10,828,828 B2
(45) Date of Patent: Nov. 10, 2020

(54) METHOD OF MANUFACTURING A PART

(71) Applicant: Flex Ltd., Singapore (SG)

(72) Inventors: Zohair Mehkri, San Jose, CA (US); Anwar Mohammed, San Jose, CA (US); David Geiger, Dublin, CA (US); Murad Kurwa, San Jose, CA (US); Jesus Tan, San Jose, CA (US)

(73) Assignee: FLEX LTD., Singapore (SG)

( * ) Notice: Subject to any disclaimer, the term of this patent is extended or adjusted under 35 U.S.C. 154(b) by 224 days.

(21) Appl. No.: 15/807,161

(22) Filed: Nov. 8, 2017

(65) Prior Publication Data

US 2018/0126633 A1 May 10, 2018

Related U.S. Application Data

(60) Provisional application No. 62/418,900, filed on Nov. 8, 2016.

(51) Int. Cl.
| | | |
|---|---|---|
| *B29C 70/68* | (2006.01) | |
| *B29C 70/88* | (2006.01) | |
| *B29C 64/153* | (2017.01) | |
| *B33Y 80/00* | (2015.01) | |
| *B33Y 10/00* | (2015.01) | |
| *B29C 70/70* | (2006.01) | |
| *B29C 64/10* | (2017.01) | |
| *B29C 64/118* | (2017.01) | |
| *B29C 64/124* | (2017.01) | |

(52) U.S. Cl.
CPC ............ *B29C 64/153* (2017.08); *B29C 64/10* (2017.08); *B29C 64/118* (2017.08); *B29C 64/124* (2017.08); *B29C 70/70* (2013.01); *B33Y 10/00* (2014.12); *B33Y 80/00* (2014.12)

(58) Field of Classification Search
CPC ... B29C 64/118; B29C 64/124; B29C 64/129; B29C 64/135; B29C 64/153; B29C 70/68; B29C 70/685; B29C 70/70; B29C 70/88; B33Y 10/00; B33Y 80/00
USPC ......... 264/259, 271.1, 279, 279.1, 308, 401, 264/497
See application file for complete search history.

(56) References Cited

U.S. PATENT DOCUMENTS

| | | | |
|---|---|---|---|
| 5,705,117 A * | 1/1998 | O'Connor ............. | B29C 64/135 264/401 |
| 2002/0125612 A1* | 9/2002 | Gotzen ................. | B29C 64/135 264/272.15 |
| 2008/0006966 A1* | 1/2008 | Mannella .............. | B29C 64/118 264/259 |

(Continued)

*Primary Examiner* — Leo B Tentoni
(74) *Attorney, Agent, or Firm* — Weber Rosselli & Cannon LLP

(57) ABSTRACT

A method of manufacturing a part includes printing a layer of 3D printable material, positioning a layer of interlay material on the layer of 3D printable material, and printing another layer of 3D printable material on the layer of interlay material. A manufactured part includes a base layer of 3D printable material and a plurality of pairs of alternating layers disposed on the base layer of 3D printable material. Each pair of the plurality of pairs includes a layer of interlay material and another layer of 3D printable material printed on the layer of interlay material. The layers of interlay material provide at least one property to the manufactured part not provided by the layers of 3D printable material.

14 Claims, 3 Drawing Sheets

(56) References Cited

U.S. PATENT DOCUMENTS

2008/0211124 A1* 9/2008 Zagagi .................... B29C 70/68
264/35
2009/0173443 A1* 7/2009 Kozlak ................ B29C 64/135
156/303.1

* cited by examiner

METHOD OF MANUFACTURING A PART

CROSS-REFERENCE TO RELATED APPLICATIONS

This application claims the benefit of, and priority to, U.S. Provisional Patent Application No. 62/418,900, entitled "METHOD TO REINFORCE 3D PRINTED PARTS WITH HIGH STRENGTH INTERLAYERS" and filed on Nov. 8, 2016, the entire contents of which are hereby incorporated herein by reference.

TECHNICAL FIELD

The present disclosure relates to the manufacturing of parts and, more specifically, to printed parts including interlay material layers and methods of manufacturing printed parts including interlay material layers.

BACKGROUND

The manufacture of parts via printed processes, e.g., 3D printing, is advantageous in that it eliminates the need for expensive tooling and enables the creation of parts of almost any shape or geometry from a digital model file. However, printed processes are restrictive in that the types of readily available materials that can be printed are limited and specific formulations of materials are either unavailable or cost prohibitive. As a result, printed parts are not readily customizable to have particular material properties.

It would therefore be desirable to have the ability to manufacture parts via a printed process, e.g., 3D printing, that are readily customizable to have particular material properties.

SUMMARY

The present disclosure provides printed parts including interlay material layers that enable customization of the particular properties of the parts. The present disclosure also provides methods of manufacturing such printed parts. These and other aspects and features of the present disclosure are detailed below. To the extent consistent, any of the aspects and features described herein may be used in conjunction with any or all of the other aspects and features described herein.

A method of manufacturing a part provided in accordance with the present disclosure includes printing a layer of 3D printable material, positioning a layer of interlay material on the layer of 3D printable material, and printing another layer of 3D printable material on the layer of interlay material.

In an aspect of the present disclosure, the method further includes positioning another layer of interlay material on the another layer of 3D printable material and printing still another layer of 3D printable material on the another layer of interlay material. These steps may be repeated a plurality of times.

In another aspect of the present disclosure, the interlay material provides a property to the manufactured part not provided by the printed layers. The property may include, for example, conductivity, increased rigidity, or increased strength.

In another aspect of the present disclosure, the printing includes 3D printing via stereolithography, fused deposition modeling, or selective laser sintering.

In still another aspect of the present disclosure, the positioning is performed manually. Alternatively, the positioning may be performed automatically.

In yet another aspect of the present disclosure, the layer of 3D printable material and the another layer of 3D printable material are formed from different 3D printable materials. Alternatively, the layer of 3D printable material and the another layer of 3D printable material are formed from the same 3D printable materials.

In still yet another aspect of the present disclosure, the layer of 3D printable material defines a first thickness and the another layer of 3D printable material defines a second thickness different from the first thickness. Alternatively, the layer of 3D printable material and the another layer of 3D printable material define equal thicknesses.

In another aspect of the present disclosure, printing the another layer of 3D printable material fuses the layer of 3D printable material, the layer of interlay material, and the another layer of 3D printable material with one another.

In yet another aspect of the present disclosure, the interlay material is provided in one of: sheets, a roll, or loosely.

A manufactured part provided in accordance with the present disclosure includes a base layer of 3D printable material and a plurality of pairs of alternating layers disposed on the base layer of 3D printable material. Each pair of the plurality of pairs includes a layer of interlay material and another layer of 3D printable material printed on the layer of interlay material. The layers of interlay material provide at least one property to the manufactured part not provided by the layers of 3D printable material.

In aspects of the present disclosure, the property is conductivity, increased rigidity, or increased strength.

BRIEF DESCRIPTION OF THE DRAWINGS

Various aspects and features of the present disclosure are described hereinbelow with reference to the drawings wherein like numerals designate identical or corresponding elements in each of the several views and.

DETAILED DESCRIPTION

Figure 1:
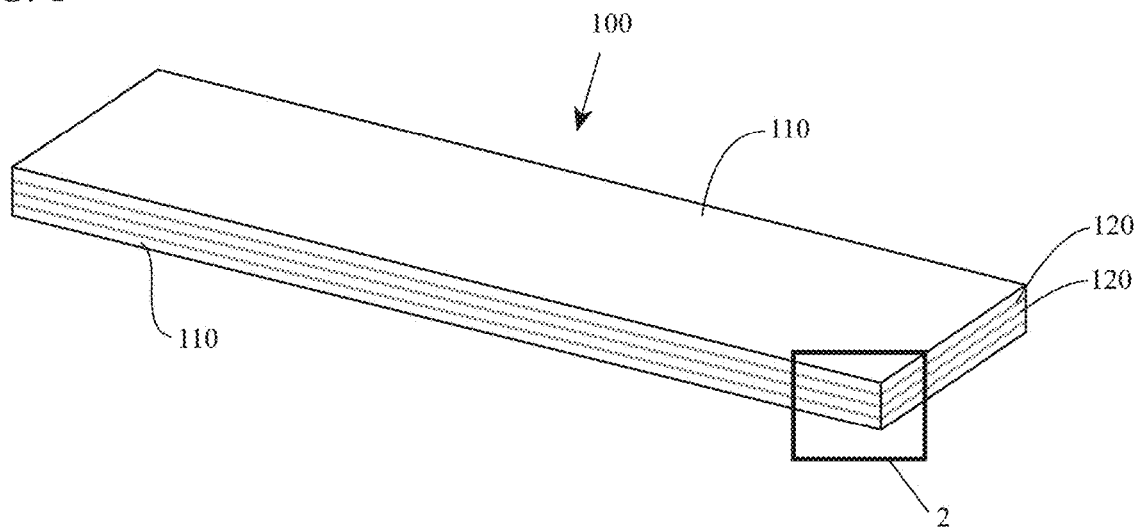
FIG. 1 is a perspective view of a printed part including interlay material layers provided in accordance with aspects of the present disclosure.
Figure 2:
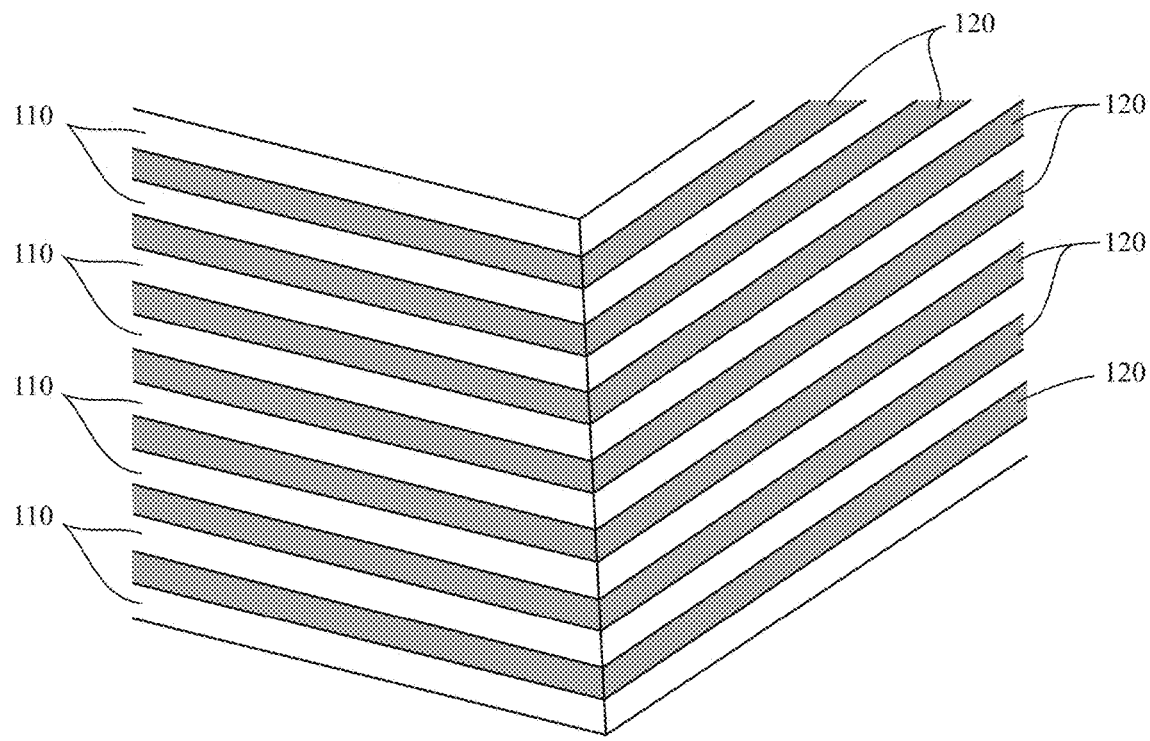
FIG. 2 is an enlarged, perspective view of the area of detail indicated as "2" in FIG. 1.

Referring to FIGS. 1 and 2, a part provided in accordance with the present disclosure is shown generally identified by reference numeral 100. Part 100, although illustrated as defining a rectangular box-like configuration, may define any suitable shape, dimensions, or other configuration, depending upon the purpose of part 100. Part 100, more specifically, includes a plurality of first layers 110 and a plurality of second layers 120. Part 100 may be formed via alternating first and second layers 110, 120, respectively, as illustrated, or may include other patterned or non-patterned arrangements of layers 110, 120. Additionally, layers 110, 120, may define similar thicknesses as other layers 110, 120 of like and/or different kind, or may define different thicknesses as other layers 110, 120 of like and/or different kind. Further, each layer 110, 120 may extend over only a portion of the entirety of part 100, and/or different layers 110, 120 may extend over different portions of part 100 in order to achieve a desired configuration of part 100

Each of the plurality of first layers 110 is formed via printing, e.g., 3D printing, and may be formed from any suitable material, or combination of materials. For example, each of the first layers 110 may be formed from a high-temperature grade 3D printable plastic or other commercially available 3D printable material. Each of the plurality of first layers 110 may be formed from the same material or combination of materials, or some of first layers 110 may be formed from different materials or different combinations of materials from other first layers 110. Further, the plurality of first layers 110 may be printed from a resin using stereolithography (SLA), may be printed from filament via fused deposition modeling (FDM), may be printed from a powder using selective laser sintering (SLS), or may be printed from a combination of resin, filament, and/or powder using SLA, SFM, and/or SLS, respectively.

Printing the first layers 110 is advantageous in that it enables the first layers 110 to be customized to a particular configuration, e.g., shape, dimensions, etc., without the need for tooling or other dedicated manufacturing equipment. Each first layer 110, more specifically, is printed from a digital model file (e.g., created on a general purpose computer with suitable CAD software) designed based upon the desired configuration of that particular first layer 110 or group of first layers 110. However, depending upon the desired properties of part 100, it may be difficult, time consuming, and/or cost prohibitive to create part 100 to include the desired properties while forming the part entirely from printing. That is, formulating specific materials or combinations of materials capable of being 3D printed and also exhibiting the desired properties is difficult, time consuming, and/or costly.

Referring still to FIGS. 1 and 2, in order to facilitate manufacture of part 100 to include properties not readily achievable by forming part 100 entirely from printing, part 100 further includes, as noted above, a plurality of second layers 120 formed differently from first layers 110. Each second layer 120, more specifically, is formed from an interlay material or materials configured to provide properties to part 100 that are difficult, time-consuming, and/or cost prohibitive to provide via printing. The interlay material of some or all of second layers 120 may be, for example, glass fiber cloth, glass fiber mat, copper foil, mesh copper, mesh steel, plastic sheet, combinations thereof, etc. Utilizing copper, e.g., copper foil or mesh copper, as the interlay material of at least one of the second layers 120, for example, enables part 100 to be conductive, thus enabling electrical connections between part 100 and another part or parts. As another example, utilizing glass, e.g., glass fiber cloth or glass fiber mat, as the interlay material of at least one of the second layers 120, provides increased rigidity to part 100. Utilizing steel, e.g., mesh steel, as the interlay material of at least one of the second layers 120, as another example, provides increased strength to part 100. However, the above interlay materials and properties provided thereby are merely exemplary, as any suitable interlay material(s) may be utilized to provide a desired property or set of properties to part 100.

The manufacturing process for forming second layers 120 depends upon the interlay material or materials utilized to form second layers 120. Further, the interlay material may be formed separately and thereafter assembled on the other, previously-assembled layers 110, 120 to form the next second layer 120, or may be formed and assembled on the other, previously-assembled layers 110, 120 to form the next second layer 120 as part of the same step, e.g., simultaneously or near-simultaneously. Each second layer 120 may be defined by a plurality of layers of interlay material(s), in embodiments where the interlay material is formable into layers, or may be formed with a desired thickness, in embodiments where the interlay material is not formable into layers. Depending upon the particular interlay material or materials utilized, the interlay material may be provided as a sheet of material, a roll of material, loosely in a container, as a plurality of strips, rods, bars, or other components to be arranged in a particular pattern, or in other suitable form to facilitate positioning the interlay material on the other layers 110, 120 to form a second layer 120.

Figure 3:
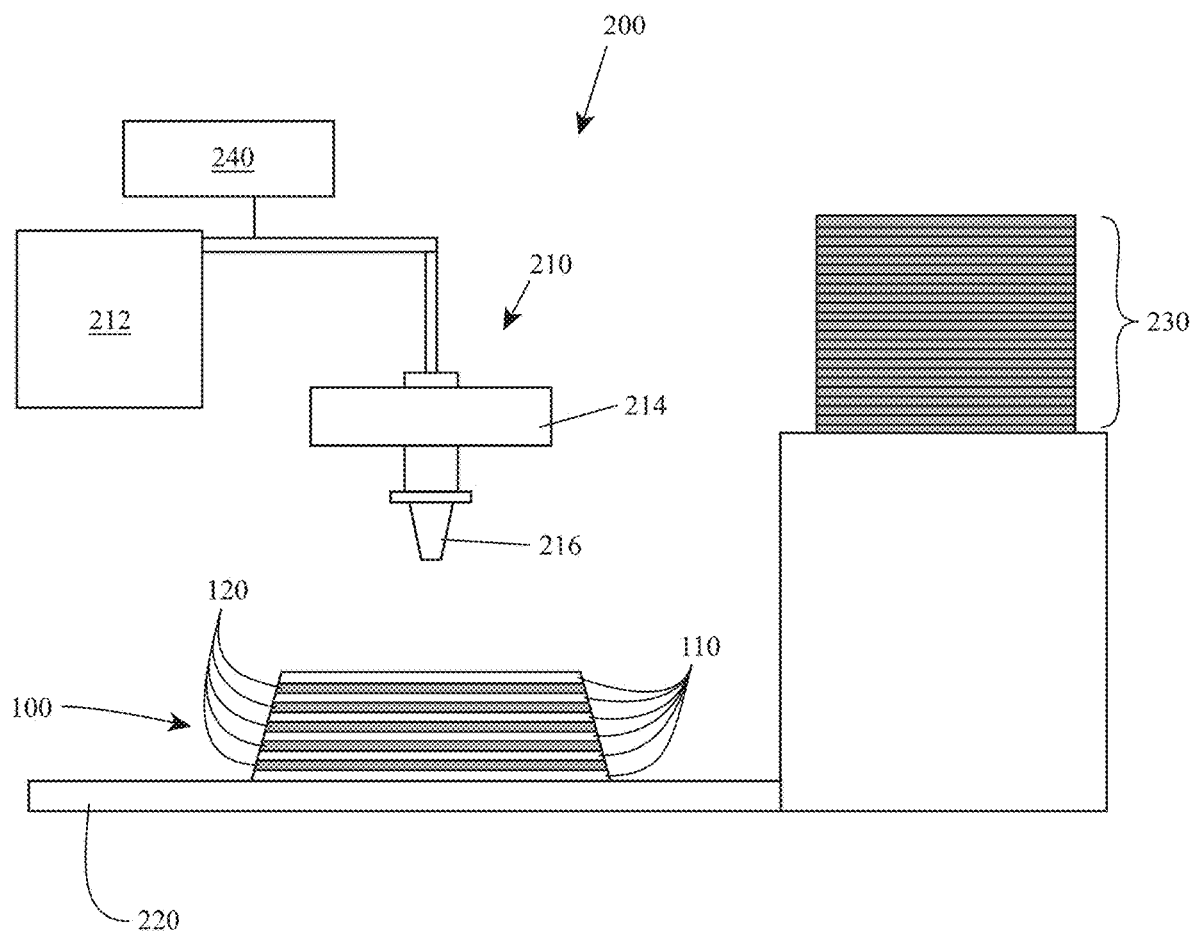
FIG. 3 is a schematic drawing illustrating a system for manufacturing a printed part including interlay material layers in accordance with aspects of the present disclosure.

Turning now to FIG. 3, a system for manufacturing part 100 in accordance with the present disclosure is illustrated generally as system 200. System 200 includes a 3D printer 210 configured, as illustrated, for FDM 3D printing, although other suitable 3D printers are also contemplated. System 200 further includes a build platform 220 for supporting the part 100 to be manufactured, and a supply of interlay material 230, which, as noted above, may be sheets of material (stacked, as shown), as a roll of material, or in other suitable form. System 200 further includes a computer 240 configured to control the 3D printing process based upon the digital model file input thereto to manufacture the part 100 in accordance with the digital model file.

FDM 3D printer 210 generally includes a filament supply 212, which may be in the form of a spool, an extrusion head 214 that is movable in two axial directions over build platform 220 and is configured to heat the filament provided by the filament supply 212, and an extrusion nozzle 216 attached to extrusion head 214 for extruding the heated filament onto the build platform 220 or portion of the part 100 that has already been built. In embodiments where multiple materials are 3D printed, e.g., where the plurality of first layers 110 are formed from a combination of materials and/or different first layers 110 are formed from different materials, multiple filament supplies 212 may be provided. In embodiments, extrusion head 214 may further be configured to move vertically.

Build platform 220 is configured to support the part 100 to be manufactured thereon, as noted above. In embodiments, build platform 220 may be configured to move vertically, e.g., towards or way from extrusion nozzle 216, to define a desired spacing between extrusion nozzle 216 and the part 100 to be manufactured. In embodiments, build platform 220 is configured to move in two additional axial directions, thus obviating the need for extrusion head 214 to do so, although any combination of motion between build platform 220 and extrusion head 214 to achieve motion in all three coordinate axial directions are contemplated. With respect to vertical adjustment, for example, as the part 100 is manufactured and, thus, increases in height, build platform 220 may be lowered (and/or extrusion head 214 raised) to maintain a desired spacing between extrusion nozzle 216 and the part 100.

Continuing with reference to FIG. 3, the FDM 3D printer 210 is configured to print the first plurality of layers 110, starting with a base first layer 110, on the build platform 220. The supply of interlay material 230 is utilized to form the plurality of second layers 120 and, as noted above, may be interlayed such that the first and second layers 110, 120 define an alternating configuration (as illustrated), or may be interlayed in any other suitable configuration. In embodiments where multiple interlay materials are utilized to form the second layers 120 and/or different second layers 120, multiple supplies of interlay material 230 may be provided.

In the embodiment illustrated in FIG. 3, once the base first layer 110 is printed, a suitable number of sheets of interlay material from the supply of interlay material 230 are disposed on the base first layer 110 to form a second layer 120 of interlay material. Disposing the interlay material on the base first layer 110 to form the second layer 120 of interlay material may be performed manually, or may be performed automatically using suitable machinery. In automatic embodiments, the machinery utilized may be controlled by computer 240 to provide a fully automated and centrally-controlled system of manufacturing part 100 with layers 110, 120. Further, in embodiments where the material is stored in a different manner, e.g., in rolls, loosely in a container, etc., rather than disposing sheets of interlay material, the interlay material may be disposed on the base first layer 110 in an manner suitable for that particular interlay material.

With the second layer 120 of interlay material positioned as detailed above, an intermediate first layer 110 is printed from 3D printer 210 on top of the second layer 120 of interlay material. Printing the intermediate first layer 110 on top of the second layer 120 of interlay material causes the intermediate first layer 110 to encapsulate, penetrate, and/or otherwise fuse with the second layer 120 and the base first layer 110 below the second layer 120 to thereby form an integral portion of part 100. More specifically, where the second layer 120 is porous, the intermediate first layer 110 penetrates the second layer 120 to fuse the layers to one another. On the other hand, where the second layer 120 is not porous, the second layer 120 may be dimensioned slightly smaller than the first layers 110 to enable the intermediate first layer 110 to encapsulate the second layer 120. Other suitable configurations to facilities the fusion of the layers with one another are also contemplated such as, for example, perforations in the second layer 120. As can be appreciated, the above-detailed process is repeated, alternating between (or otherwise arranging) second layers 120 of interlay material and intermediate first layers 110 until a final, top first layer 110 is printed on the top-most second layer 120 of interlay material to complete manufacture of the part 100.

Figure 4:
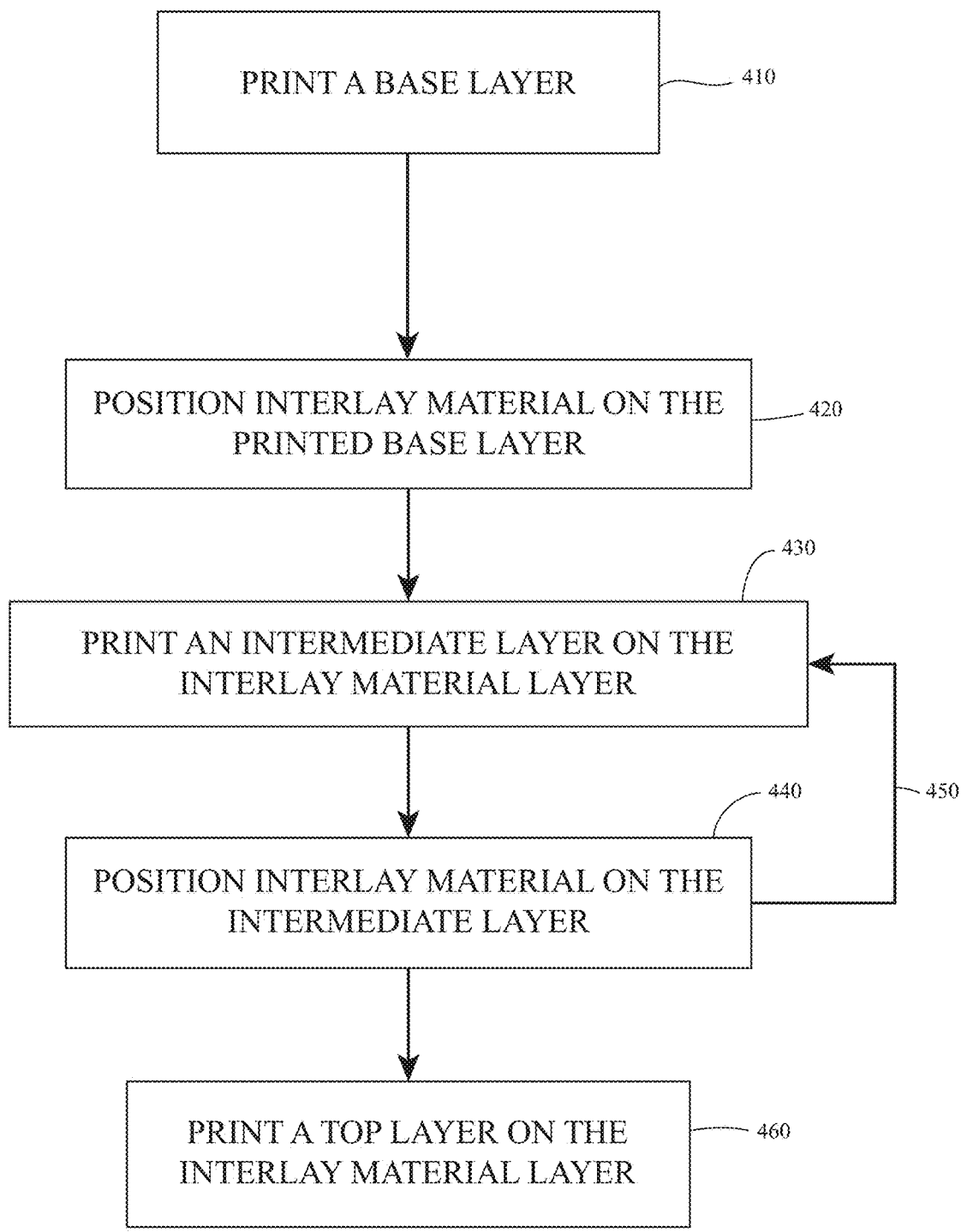
FIG. 4 is a flow diagram illustrating a method of manufacturing a printed part including interlay material layers in accordance with aspects of the present disclosure.

Turning now to FIG. 4, a method of manufacturing a part, e.g., part 100 (FIG. 1), is described. The method of manufacturing detailed below may be effectuated using system 200 (FIG. 3), as detailed above, or using any other suitable equipment, and may utilize any suitable materials, such as those detailed above or other materials.

Initially, at step 410, a base layer of 3D printed material is 3D printed. At step 420, interlay material is positioned on the base layer of 3D printed material to form an interlay material layer. At step 430, an intermediate layer of 3D printed material is 3D printed onto the interlay material layer to fuse the base 3D printed layer, the interlay material layer, and the intermediate 3D printed layer into an integral component. At step 440, another interlay material is positioned on the intermediate layer of 3D printed material. As indicated at step 450, steps 430 and 440 may be repeated any suitable number of times, in order to provide a desired amount of intermediate layer pairs, e.g., intermediate 3D printed material layer and interlay material layer pairs. Once the desired amount of intermediate layer pairs is provided, finally, at step 460, a top layer of 3D printed material is 3D printed onto the top-most interlay material layer to form the completed, integral part. In other embodiments, rather than providing steps 420, 430, and 440, only a single interlay material layer is provided between the base and top layers of 3D printed material.

Persons skilled in the art will understand that the structures and methods specifically described herein and shown in the accompanying figures are non-limiting exemplary embodiments, and that the description, disclosure, and figures should be construed merely as exemplary of particular embodiments. It is to be understood, therefore, that the present disclosure is not limited to the precise embodiments described, and that various other changes and modifications may be effected by one skilled in the art without departing from the scope or spirit of the disclosure. Additionally, the elements and features shown or described in connection with certain embodiments may be combined with the elements and features of certain other embodiments without departing from the scope of the present disclosure, and that such modifications and variations are also included within the scope of the present disclosure. Accordingly, the subject matter of the present disclosure is not limited by what has been particularly shown and described.

What is claimed is:

1. A method of manufacturing a part, comprising:
   printing a layer of 3D printable material;
   positioning a layer of interlay material on the layer of 3D printable material; and
   printing a second layer of 3D printable material on the layer of interlay material wherein the part includes a plurality of layers of 3D printable material and a plurality layers of interlay material arranged in an alternating pattern, wherein each layer of 3D printable material, after a first layer of 3D printable material, substantially conforms to a preceding layer of interlay material.

2. The method according to claim 1, wherein the interlay material provides a property to the manufactured part not provided by the printed layers.

3. The method according to claim 2, wherein the property is conductivity.

4. The method according to claim 2, wherein the property is increased rigidity.

5. The method according to claim 2, wherein the property is increased strength.

6. The method according to claim 1, wherein printing includes 3D printing via stereolithography, fused deposition modeling, or selective laser sintering.

7. The method according to claim 1, wherein positioning is performed manually.

8. The method according to claim 1, wherein positioning is performed automatically.

9. The method according to claim 1, wherein the layer of 3D printable material and the second layer of 3D printable material are formed from different 3D printable materials.

10. The method according to claim 1, wherein the layer of 3D printable material and the second layer of 3D printable material are formed from the same 3D printable materials.

11. The method according to claim 1, wherein the layer of 3D printable material defines a first thickness and the second layer of 3D printable material defines a second thickness different from the first thickness.

12. The method according to claim 1, wherein the layer of 3D printable material and the second layer of 3D printable material define equal thicknesses.

13. The method according to claim 1, wherein printing the second layer of 3D printable material fuses the layer of 3D printable material, the layer of interlay material, and the second layer of 3D printable material with one another.

14. The method according to claim 1, wherein the interlay material is provided in one of:
 sheets, a roll, or loosely.

* * * * *